United States Patent [19]

Yamagata et al.

[11] Patent Number: 5,207,210
[45] Date of Patent: May 4, 1993

[54] CYLINDER HEAD STRUCTURE OF AN INTERNAL COMBUSTION ENGINE

[75] Inventors: Naoyuki Yamagata; Noriyuki Iwata; Kenji Kashiyama, all of Hiroshima; Kazumasa Nomura, Higashihiroshima, all of Japan

[73] Assignee: Mazda Motor Corporation, Hiroshima, Japan

[21] Appl. No.: 853,592

[22] Filed: Mar. 18, 1992

[30] Foreign Application Priority Data

Mar. 18, 1991 [JP] Japan .................. 3-052433

[51] Int. Cl.⁵ .......................... F02B 23/00
[52] U.S. Cl. ...................... 123/661; 123/193.5
[58] Field of Search ............. 123/41.82 R, 193.5, 123/315, 432, 661

[56] References Cited

U.S. PATENT DOCUMENTS 4,972,807 11/1990 Morishita ............. 123/41.82 R
4,972,814 11/1990 Matsuki et al. ............. 123/661

FOREIGN PATENT DOCUMENTS 59-203818 11/1984 Japan .................. 123/661
2-119617 5/1990 Japan .

Primary Examiner—Noah P. Kamen
Attorney, Agent, or Firm—Keck, Mahin & Cate

[57] ABSTRACT

An engine with a row of cylinders is provided with two intake ports and intake valves and two exhaust ports and exhaust valves for each cylinder. The intake ports are arranged on one side of a center line of the row of cylinders, adjacent to each other, and side by side in a direction parallel to the cylinder row. The exhaust ports are arranged on another side of the center line, adjacent to each other, and side by side in the direction parallel to the cylinder row so that their centers are located at a distance apart which is larger than a distance at which centers of the intake ports are separated. The cylinder is formed with a "squish" surface between the exhaust ports which provides a squish area between the cylinder head and piston. This produces a squish or compressed flow of the air-fuel mixture to the exhaust ports in the combustion chamber.

5 Claims, 3 Drawing Sheets

CYLINDER HEAD STRUCTURE OF AN INTERNAL COMBUSTION ENGINE

BACKGROUND OF THE INVENTION

1. Field of the Invention

The present invention is concerned with the structure of cylinder heads of internal combustion engines and, more particularly, with the cylinder head structure of four valve internal combustion engines which are endowed with two intake valves and two exhaust valves for each cylinder.

2. Description of Related Art

Generally, automobile internal combustion engine design focusses on the compactness of combustion chambers in order to achieve improvements in combustion (i.e., improved thermal efficiency, improved knock resistance, etc.). In particular, four valve engines, which are endowed with two intake valves and two exhaust valves for each cylinder, are arranged so that each intake valve is located in close proximity to an exhaust valve. Most designs concentrate on making the combustion chamber compact. Ordinarily, since the intake valve is made larger than the exhaust valve, due to a demand for improved charging efficiency, the intake ports and the exhaust ports, which open into the combustion chamber, are, respectively, aligned on straight lines offset from and on opposite sides of a diametric line of the combustion chamber. The intake ports and the exhaust ports are arranged so as to be adjacent to the vertical center line of the combustion chamber. Each intake port is located closer to the center of the combustion chamber than the exhaust port. Such an intake and exhaust port arrangement is known from, for example, Japanese patent application No. 63-273,746, entitled "Combustion Chamber of Engine," filed on Oct. 28, 1988 and published as Japanese Unexamined Patent Publication No. 2-119,617 on May 7, 1990.

In the arrangement described in the publication mentioned above, in which the two exhaust ports are in close proximity to each other, the region of a combustion chamber in which the two exhaust ports open reaches high temperatures easily. This results in knocking and, specifically, in pre-ignition relating knocking. Particularly, in supercharged engines, since one of the factors determining how efficiently an engine provides its power while it operates under supercharging is the occurrence of knocking, the occurrence of such knocking due to the arrangement of exhaust ports is a serious problem. Furthermore, when operating such an engine under supercharging, since an extremely high thermal load occurs in the cylinders, the reliability of parts of the cylinder head must be improved. However, in an engine which has two exhaust ports arranged in close proximity to each other, a portion, or what is called a "valve bridge," between the two exhaust ports of the cylinder head, as well as a portion between each of the exhaust ports and a spark plug, is relatively thin in section. The valve bridge, therefore, cannot be adequately cooled. Consequently, under a high thermal load, the engine has a decreased reliability.

SUMMARY OF THE INVENTION

It is a primary object of the present invention to provide an improved cylinder construction of a four cylinder or other type engine having two intake valves and two exhaust valves for each cylinder. Each cylinder is formed with a "squish" area between two exhaust ports opening into a combustion chamber and arranged side by side in a direction of a row of cylinders. Such provides improved knock resistance and improved reliability of the cylinder head.

The primary object of the present invention is achieved by a particular internal combustion engine construction in which a plurality of cylinders are arranged in a row and endowed with two intake valves and two exhaust valves for each cylinder. An air-fuel mixture is introduced into the combustion chamber so that it is mainly concentrated on a side of the combustion chamber near intake ports during a compression stroke. The internal combustion engine is formed with two intake ports for each cylinder. The intake ports are arranged adjacent to each other and on one side of a center line of the row of cylinders, and side by side in a direction parallel to the row of the cylinders. The engine also includes two exhaust ports for each cylinder. The exhaust ports are arranged adjacent to each other on another side of the center line, and side by side. The intake ports and exhaust ports extend in the same direction. Each of two adjacent intake ports is separated from the other. Centers of the two adjacent intake ports are located at a smaller distance apart than a distance between centers of the two adjacent exhaust ports. In the combustion chamber, a projection or similar element is provided between the two adjacent exhaust ports. The projection has a flat undersurface extending from a lower periphery of a lower wall of the cylinder head and forms a "squish" area between the cylinder head and the piston for causing a turbulent or swirling flow of an air-fuel mixture on the side of the exhaust ports in the, combustion chamber. Combustion chambers having such a squish area are typically called "squish type" combustion chambers. A squish type combustion chamber is a particular kind of combustion chamber in which, at a position near the end of a compression stroke of a piston, a combustion chamber volume is narrowed or reduced to strongly force out an air-fuel mixture in the narrowed space squish area). According to the present invention, the squish area is configured so that it produces a swirling flow of the air-fuel mixture. Either or both of the two adjacent intake ports are formed so as to produce and direct a tumbling, turbulent flow of air-fuel mixture towards the exhaust ports.

The engine further includes engine cooling means, such as a water jacket, formed in the cylinder head so that an aqueous engine coolant flows through the cylinder head. The coolant flows from a side at which the two exhaust ports are formed towards a side at which the two exhaust ports are formed. Also, the coolant passes initially between the two exhaust ports, and then on one side of each intake port remote, in the direction of the row of the cylinders, from another intake port.

In the present invention, because a comparatively large space is left between the exhaust ports, a large squish area is formed between the piston and the cylinder head on the exhaust port side of the combustion chamber. Because of this, at the end of a compression stroke, the air-fuel mixture is mainly concentrated within the combustion chamber on the intake port side by a strong squish flow of air-fuel mixture caused on the exhaust port side. This results in less knocking in the vicinity of the exhaust ports, which vicinity easily reaches high temperatures. In addition, there is no decrease in the thickness between a portion of the cylinder at which a spark plug is installed and the exhaust ports or valve bridge. There is also no decrease in space between adjacent exhaust ports. Consequently, even under a high thermal load, the reliability of the cylinder head can be maintained.

In the engine, in which a "tumble" or turbulent flow is created within the combustion chamber, an air-fuel mixture, entering into the combustion chamber through the intake ports, ordinarily flows toward the exhaust ports opposite to the intake ports along the cylinder wall and the top surface of the piston. Such creates a tumble or turbulent flow of the air-fuel mixture. In particular, at the end of a compression stroke, the tumble flow of the air-fuel mixture is forced towards the exhaust ports, so that the air-fuel mixture tends to accumulate on the side of the exhaust ports in the combustion chamber. However, by means of a strong squish or compression of the air-fuel mixture caused on the side of the cylinder at which the exhaust ports are provided, the air-fuel mixture tumble flow is pushed back towards the side of the cylinder at which the intake ports are provided, so that the air-fuel mixture is mainly concentrated on the side of the intake ports in the combustion chamber. As a result, knocking, produced in a area of the combustion chamber around the exhaust ports, which easily reaches high temperatures, is suppressed.

Since aqueous coolant, flowing in the cylinder head from the exhaust port side to the intake port side, passes initially between the exhaust ports, it cools a portion of the cylinder head between the adjacent exhaust ports adequately and sufficiently. Furthermore, the aqueous coolant, after having passed between the exhaust ports, is deflected so as to flow past a side of each of the adjacent intake ports, remote from another of the adjacent intake ports. Portions around both the adjacent exhaust intake ports and the intake ports are, therefore, cooled adequately and sufficiently. Because of this, cooling of the cylinder head on the side of the exhaust ports, which is subjected to severe thermal conditions, is efficiently accomplished. As a result, knocking occurs less frequently and, even if the engine is subjected to high thermal loads, it has an improved reliability.

BRIEF DESCRIPTION OF THE DRAWINGS

The above and other objects and features of the present invention will be apparent to those skilled in the art from the following description of a preferred embodiment thereof when considered in conjunction with the accompanying drawings, in which.

DETAILED DESCRIPTION OF THE PREFERRED EMBODIMENT

Figure 1:
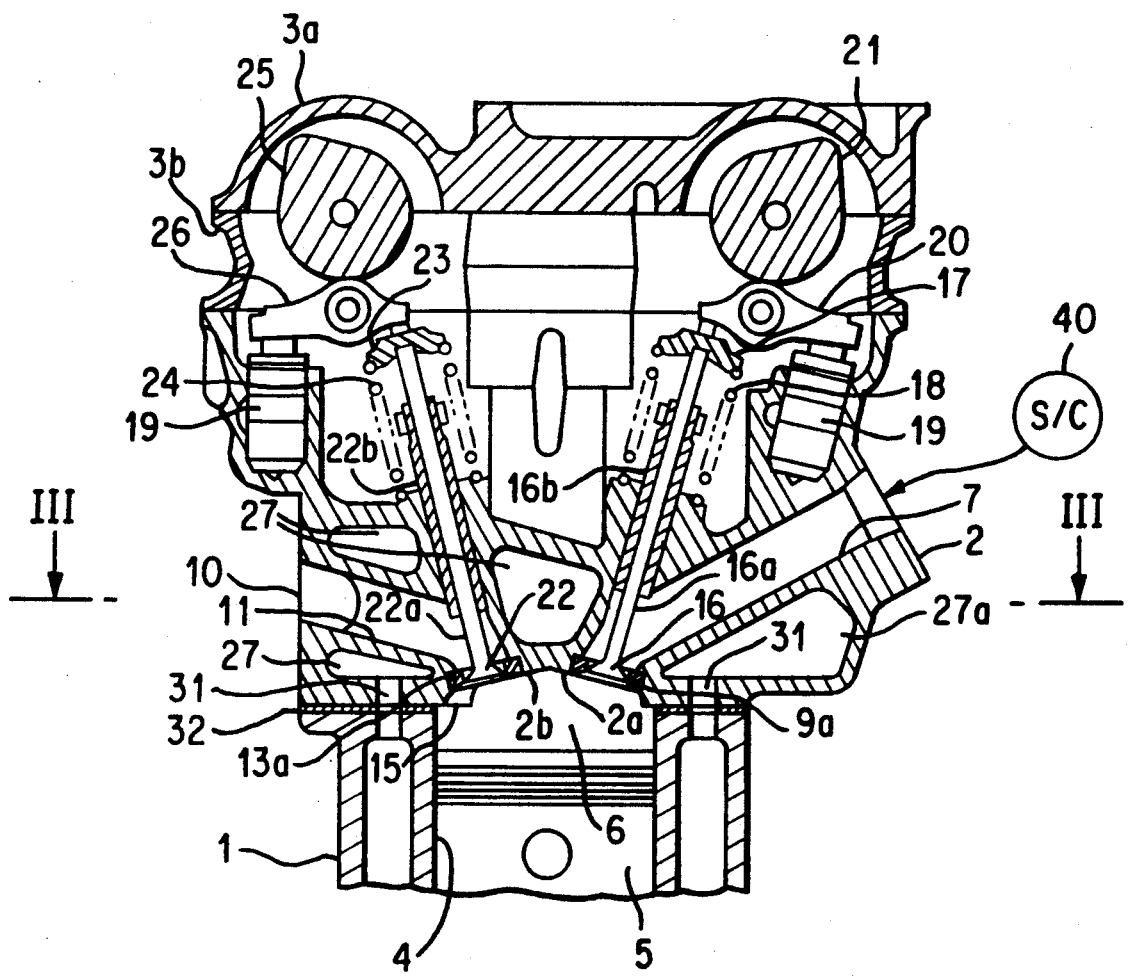
FIG. 1 is a vertical cross-sectional view of a four-valve internal combustion engine having two intake valves and two exhaust valves for each cylinder in accordance with a preferred embodiment of the present invention.
Figure 2:
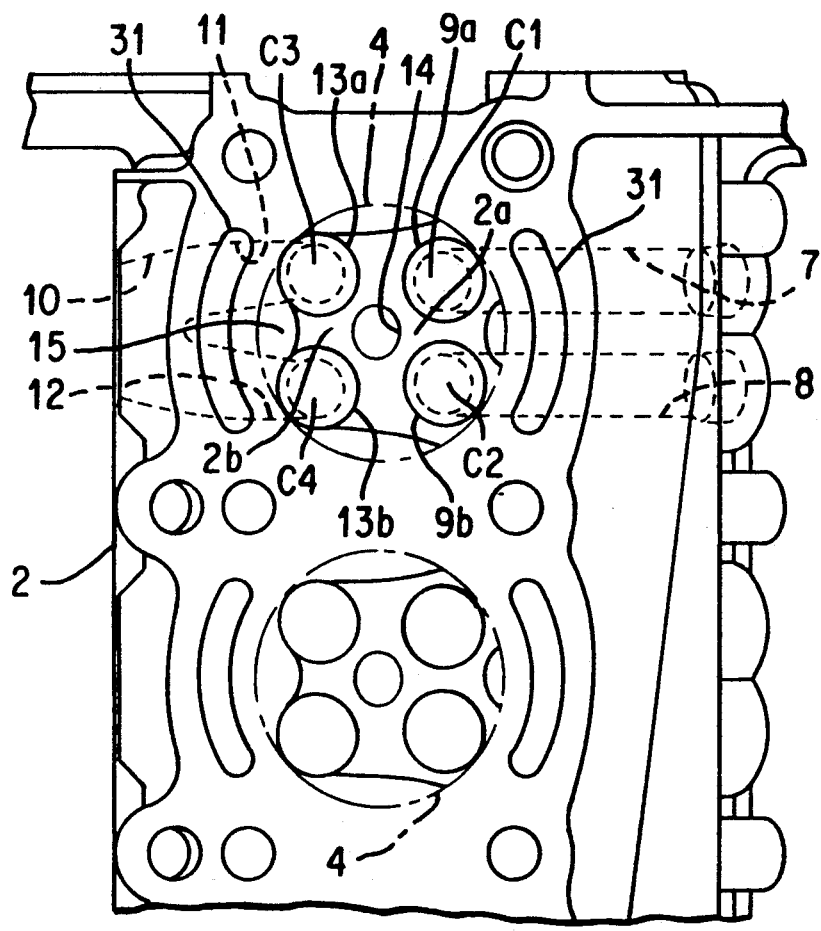
FIG. 2 is a bottom view of a cylinder head of the engine of FIG. 1.

Referring to FIGS. 1 and 2 in detail, a four-valve, internal combustion engine, having two intake valves and two exhaust valves, cylinders of which are structured according to a preferred embodiment of the present invention, is shown. The four-valve engine comprises a cylinder block 1, a cylinder head 2, which is attached or arranged on a top of the cylinder block 1 through a cylinder head gasket 31, and a cam housing 3, including upper and lower housings halves 3a and 3b. The cam housing 3 is attached to the cylinder head 2 and houses the intake and exhaust valve drive cams 21 and 25. The cylinder block 1 is formed with a plurality of cylinder bores 4 in which pistons 5 are snugly received so as to slide. A combustion chamber 6 is formed in each cylinder and defined by a conical wall surface 2a-2b formed on the bottom of the cylinder head 2, an upper portion of the cylinder bore 4 and the head surface of the piston 5.

On one side, i.e., the right side as seen in FIG. 1, of the horizontal center line (see FIG. 3) passing through the top points of the conical surface 2a-2b of the cylinder head 2, there are provided two intake ports 7 and 8. The intake ports 7 and 8 introduce and direct fresh air into the combustion chamber 6 and are independently formed in the cylinder head 2 and arranged in a row offset from the horizontal center line X. Each of the intake ports and 8 opens at one end, where an intake valve seat 9a or 9b is formed, into the combustion chamber 6 and at the other end to one side wall, i.e., the right side wall, of the cylinder head 2. It is to be noted that the intake ports are formed so as to direct flows of air-fuel mixture, introduced into the combustion chamber 6, through the chamber and towards exhaust ports 11 and 12 (which will be described in detail later) provided opposite to the intake ports 7 and 8, respectively. This causes a tumble, or turbulent, flow of the air-fuel mixture within the combustion chamber 4. The intake valve seats 9a and 9b, formed at the ends of the intake ports 7 and 8 opening into the combustion chamber 6, respectively, are arranged side by side in a direction of the row of the cylinder bores 4. As is well known in the art, the intake ports 7 and 8 are attached, at their upstream ends, with an intake manifold (not shown), secured to the cylinder head 2. A mechanical supercharger 40, driven by an output shaft (not shown), such as a crankshaft, of the engine is provided in the intake manifold for supplying supercharged air into the combustion chambers 6. Similarly, on the other side, i.e., the left side, as viewed in FIG. 1, of the horizontal center line X, there are provided two exhaust ports 11 and 12 for exhausting or discharging burned gases out of the combustion chamber 6. The exhaust ports 11 and 12 are independently formed in the cylinder head 2 and arranged in a row offset from the horizontal center line X. Each of the exhaust ports 11 and 12 opens, at one end at which an exhaust valve seat 13a or 13b is formed, into the combustion chamber 6 and, at the other end, to one side, i.e., the left side, wall of the cylinder head 2. The exhaust valve seats 13a and 13b, formed at the end of the exhaust ports 11 and 12 opening into the combustion chamber 6, respectively, are arranged side by side in a direction of the row of the cylinder bores 4. The two independent exhaust ports 11 and 12 are united at their downstream ends to form a single exhaust opening 10 opening to the left side wall of the cylinder head 2. The cylinder head 2 is formed with a vertical bore 14 (see FIG. 2) at the center of the combustion chamber 6 for receiving and supporting therein a spark plug (not shown).

In the cylinder head 2, there are incorporated two intake valves 16 for each cylinder. The intake valves open and close valve seats 9a and 9b at the ends of the intake ports 7 and 8. Each intake valve 16 has a valve stem 16a supported for sliding up and down movement by a sleeve or stem guide 16b fitted in the cylinder head 2. The intake valve 16 is urged by a valve spring 18 mounted on the valve stem 16a and retained by a spring retainer 17 secured to the valve stem 16a so as to be moved upward and close the intake port 7 or 8. For closing and opening the intake port 7 or 8, the intake valve 16 is driven by an intake cam 21 operationally coupled to the valve stem 16a by a swing arm 20 disposed therebetween. The intake port is opened and closed, via the swing arm, at a desired timing. The swing arm 20 cooperates with a hydraulic lash adjuster 19. Similarly, for each cylinder, there are incorporated two exhaust valves 22 in the cylinder head 2. The exhaust valves 22 open and close valve seats 13a and 13b at the ends of the exhaust ports 11 and 12. Each exhaust valve 22 has a valve stem 22a supported for up and down sliding movement by a sleeve or stem guide 22b fitted in the cylinder head 2. The exhaust valve 22 is urged by a valve spring 24 mounted on the valve stem 22a and retained by a spring retainer 23 secured to the valve stem 22a so as to be moved upward or close the exhaust port 11 or 12. For closing and opening the exhaust port 11 or 12, the exhaust valve 22 is driven by an exhaust cam 25 operationally coupled to the valve stem 22a by a swing arm 26 disposed therebetween so as to open and close the exhaust port at a desired timing. The swing arm 26 cooperates with a hydraulic lash adjuster 19.

As is most clearly shown in FIG. 2, the intake valve seats 9a and 9b, at first ends of the intake ports 7 and 8 opening into the combustion chamber 6, have their centers C1 and C2, respectively, with a separation or spacing therebetween smaller than a separation or spacing between centers C3 and C4 of the exhaust valve seats 13a and 13b at the ends of the exhaust ports 11 and 12 opening into the combustion chamber 6. In other words, the intake valve seats 9a and 9b are mutually adjacent and closer to each other than the exhaust valve seats 13a and 13b are to each other. The exhaust valve seats 13a and 13b are separated further away from each other than are the intake valve seats 9a and 9b.

As is most clearly shown in FIGS. 1 and 2, the cylinder head 2 is formed, on the conical wall 2b, with an inland or projection 15 having a surface which is concave relative to the combustion chamber 6. The inland or projection 15 extends along the top end of the cylinder bore 4 between the exhaust valve, seats 13a and 13c and forms what is called a "squish area" in the combustion chamber 6.

Figure 3:
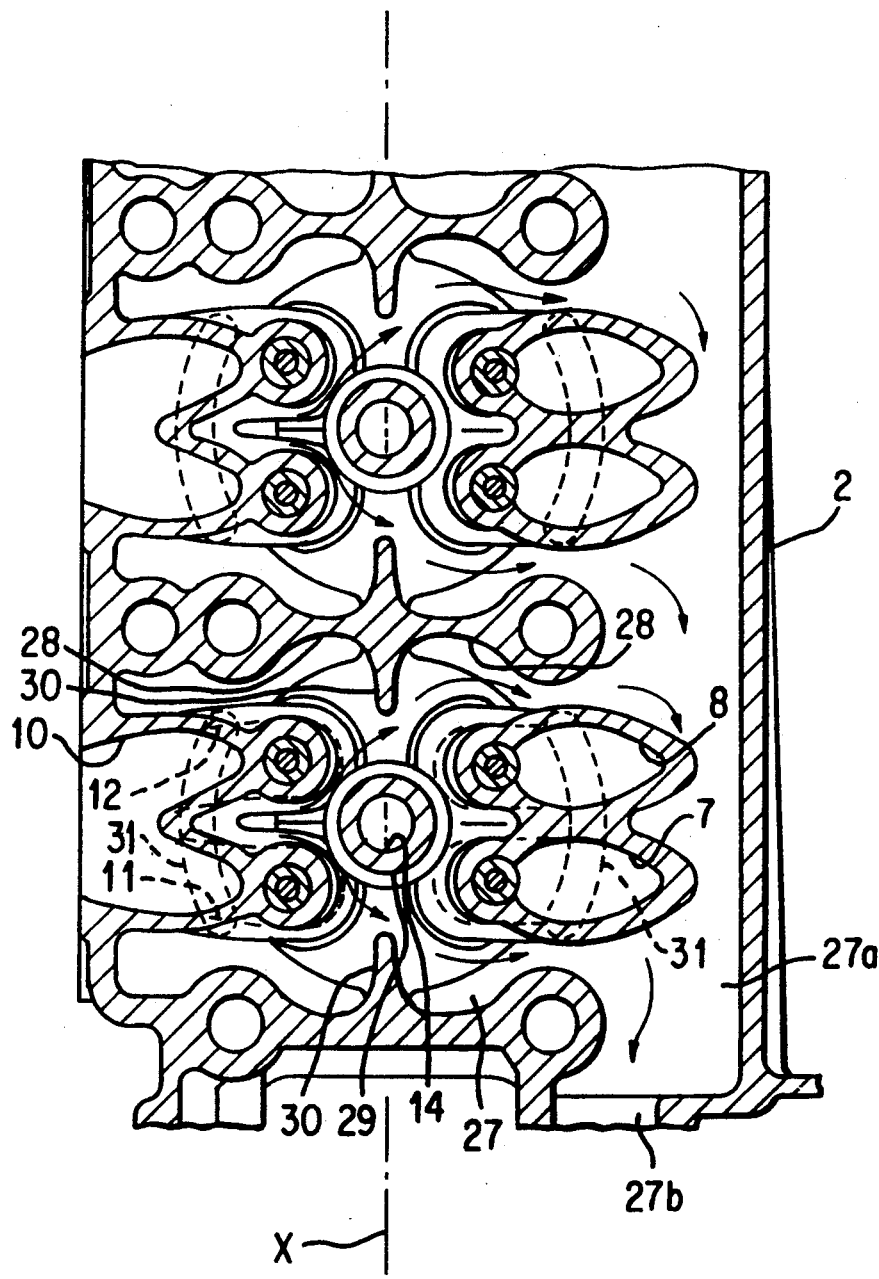
FIG. 3 is a cross-sectional view of FIG. 1 as seen along line III—III.

Aqueous coolant is circulated around the combustion chambers 6 within the cylinder head 2. The cylinder head 2 is formed with water jackets 27 through which aqueous coolant flows and is circulated so as to cool the engine. In the water jackets 27, as is shown in FIG. 3, partition walls 28 are formed so as to partly isolate the water jackets 27 and prevent aqueous coolant, flowing around the respective combustion chambers 6, from being mixed, or prohibit aqueous coolant, flowing around the respective combustion chambers 6, from flowing in the direction of the row of the cylinders. The water jackets 27 formed around each combustion chamber communicate with an aqueous coolant chamber 27a formed beneath the intake ports 7 and 8. The water jackets 27 extend in the direction of the row of the cylinders. Aqueous coolant in the water jackets 27 merges and flows into the aqueous coolant chamber 27a. The aqueous coolant chamber 27a is opened through an aqueous coolant outlet 27b at one end of the cylinder head 2 in the direction of the row of the cylinders. Between adjacent exhaust ports 11 and 12, there is formed a space facilitating a flow of aqueous coolant through the space. On one hand, each of the adjacent intake ports 7 and 8 is isolated by a rigid wall so that no space between the ports for a flow of aqueous coolant is formed. Between the partition wall 28 and a boss portion 29, in which a vertical spark plug receptacle bore 14 is formed so as to extend toward the center of the combustion chamber 6 or the center of the cylinder bore 4, a wall extension 30 is formed. The extension 30 extends, along the center line X, from the partition wall 28 toward the center of the boss portion 29. The wall extension 30 further prevents the aqueous coolant, flowing outside the adjacent exhaust ports 11 and 12 with no space provided therebetween, from flowing along the partition wall 28 toward the intake ports 7 and 8 and forces the coolant to flow around the exhaust ports 11 and 12. In particular, a large portion of the coolant is forced to flow through the space formed between each pair of adjacent exhaust ports 11 and 12. In addition, the cylinder head 2 is formed with a communication passage 31 through which the aqueous coolant flows into the water jackets 27 of the cylinder head 2 from water jackets (not shown) of the cylinder block 1.

Aqueous coolant, flowing within the water jacket 27 for each cylinder 4, flows towards the intake ports from the exhaust ports in a direction substantially perpendicular to the row of the cylinders. The coolant enters into the aqueous coolant chamber 27a at the side of the intake ports so as to merge with coolant already in the aqueous coolant chamber 27a and then be directed to the aqueous coolant outlet 27b at the end of the cylinder head 2. More specifically, the aqueous coolant flows into the water jacket 27 of the cylinder head 2 passing through the communication passage 31 from the water jacket of the cylinder block 1 at the side of the exhaust ports 11 and 12. Most of the coolant passes through the space between the adjacent exhaust ports 11 and 12 and encounters the boss portion 28 so as to be separated into two aqueous coolant flows. The aqueous coolant, thus divided into two separate flows, passes through respective spaces between the boss portion 29 and the adjacent exhaust ports 11 and 12. Each aqueous coolant flow is then directed to pass between the boss portion 29 and the wall extension 30, between the partition wall 28 and the intake port 7 or 8, and into the aqueous coolant chamber 27a on the side of the intake ports 7 and 8. All of the aqueous coolant flows passed around the respective cylinders 4 merge in the aqueous coolant chamber 27a. Finally, the aqueous coolant flows towards the aqueous coolant outlet 27b in the direction of the row of cylinders, and then out from the aqueous coolant outlet 27b toward a radiator (not shown).

An air-fuel mixture, introduced into the combustion chamber 6 through the intake ports 7 and 8, flows towards the opposing exhaust ports 11 and 12 so as to cause a tumble or turbulent flow in the combustion chamber 6. Such a tumble flow of the air-fuel mixture, at the end of a compression stroke, is directed to the exhaust ports 11 and 12, and the air-fuel mixture generally accumulates on the exhaust port side in the combustion chamber 6. The valve seats 13a and 13b, forming the openings of the exhaust ports 11 and 12 opening into the combustion chamber 6, are arranged far away from each other. Also, the inland or projection 15, formed with a surface concave to the combustion chamber 6 to provide a "squish" area, is formed between the top surface of the piston 5 and the conical wall 2b at the bottom of the cylinder head 2 at the periphery of the combustion chamber 6. Consequently, a relatively large squish area can be provided on the side of the exhaust ports 11 and 12 in the combustion chamber, 6 at the end of a compression stroke. Such a large squish area creates a strongly squished or compressed air-fuel mixture flow which is forced toward the intake port side from the exhaust port side in the combustion chamber 6 upon the completion of a compression stroke. Because of this, a tumble flow of the air-fuel mixture, flowing towards the exhaust port side at the completion of a compression stroke, is forced back towards the intake port side by means of a strong squish flow of air-fuel mixture from the exhaust port side, so that the whole air-fuel mixture is accumulated on the intake port side in the combustion chamber 6. As a result, knocking can be suppressed in the area of the combustion chamber 6 around the exhaust ports 11 and 12 in which high temperatures are easily reached and pre-ignition occurs easily. This facilitates an improvement in anti-knocking characteristics of the engine. In particular, measurable improvements in engine output in a range of operation of the engine in which the supercharger 40 is used can be obtained.

Cylinder head 2 is cooled by the aqueous coolant which flows and circulates through the water jackets 26 forming coolant passages within the cylinder head. The aqueous coolant, flowing in the cylinder head 2 from the cylinder block 1, is directed towards the intake ports 7 and 8 from the side of the exhaust ports 11 and 12. In more detail, initially, the aqueous coolant passes through the space between the two adjacent exhaust ports 11 and 12, encountering the boss portion 29 by which it is divided into two flows. Then, the coolant flows through the space between each exhaust port 11 or 12 and the boss portion 29 along the walls. Cooling, therefore, is accomplished around each of the exhaust ports 11 and 12 as well as the boss portion 29. The exhaust ports 11 and 12 are located mutually apart and far away from each other at their ends opening into the combustion chamber 6 so as to provide a sufficiently wide space therebetween. Therefore, the coolant can flow smoothly through the space and cool the exhaust ports 11 and 12 and the boss portion 29 efficiently. Consequently, temperature increases of various portions of the cylinder head 2 for the exhaust ports, which are subjected to severe thermal conditions, can be efficiently suppressed. This controls knocking and provides improved anti-knock characteristics. Also, even if high thermal loads occur during supercharging, the reliability of the cylinder head is maintained.

Because the exhaust ports 11 and 12 are located mutually apart and far away from each other at their ends which open into the combustion chamber 6, neither the thickness of the valve bridge portion between the valve seats 13a and 13b for the exhaust valves 22 nor the thickness of portion around the boss portion 29 for a spark plug have to be restricted. Rather, the thickness can be formed as required, so that the reliability of the cylinder head can be maintained at a high level even when high thermal loads during supercharging driving conditions occur.

The cylinder structure according to the present invention is extremely effective for engines which have a small cylinder bore diameter and a long piston stroke combining to provide a small combustion chamber.

What is claimed is:

1. An internal combustion engine with a plurality of cylinders arranged in a row and having two intake valves and two exhaust valves for each cylinder, each cylinder having a combustion chamber formed therein by a cylinder head and a piston, said engine comprising:
   a pair of intake ports for each cylinder arranged adjacent to each other and on one side of a center line of said row of said cylinders, said intake ports arranged side by side and in a direction parallel to said row of said cylinders;
   a pair of exhaust ports for each cylinder arranged adjacent to each other on another side of said center line, said exhaust ports arranged side by side in said direction and being separated so that their centers are at a distance apart which is larger than a distance at which centers of said intake ports are separated; and
   squish means, provided between said exhaust ports in each cylinder, for reducing a cylinder volume between said cylinder head and said piston and causing a squish flow of air-fuel mixture on a side of said combustion chamber near said exhaust ports.

2. An engine as defined in claim 1, wherein said squish means comprises a projection having a flat undersurface extending from a periphery of a lower wall of said cylinder head so as to provide a squish area between said flat undersurface and a top of said piston.

3. An engine as defined in claim 1, wherein at least one of said pair of intake ports is formed so as to produce a tumble flow of air-fuel mixture which is directed towards said exhaust ports.

4. An engine as defined in claim 1, and further comprising engine cooling means for cooling said cylinder head, said engine cooling means including a water jacket formed in said cylinder head so as to direct and pass an engine coolant, through said cylinder head, from a side of the cylinder head at which said exhaust ports are formed towards a side of said cylinder at which said intake ports are formed, said engine coolant initially passing between said pair of exhaust ports.

5. An engine as defined in claim 4, wherein said engine cooling means further comprises a partition wall disposed between each adjacent pair of said cylinders so as to direct the engine coolant through said cylinder head from a side of said cylinder head at which said exhaust ports are formed towards a side of said cylinder head at which said exhaust ports are formed between said exhaust ports.

* * * * *